Figure 1:
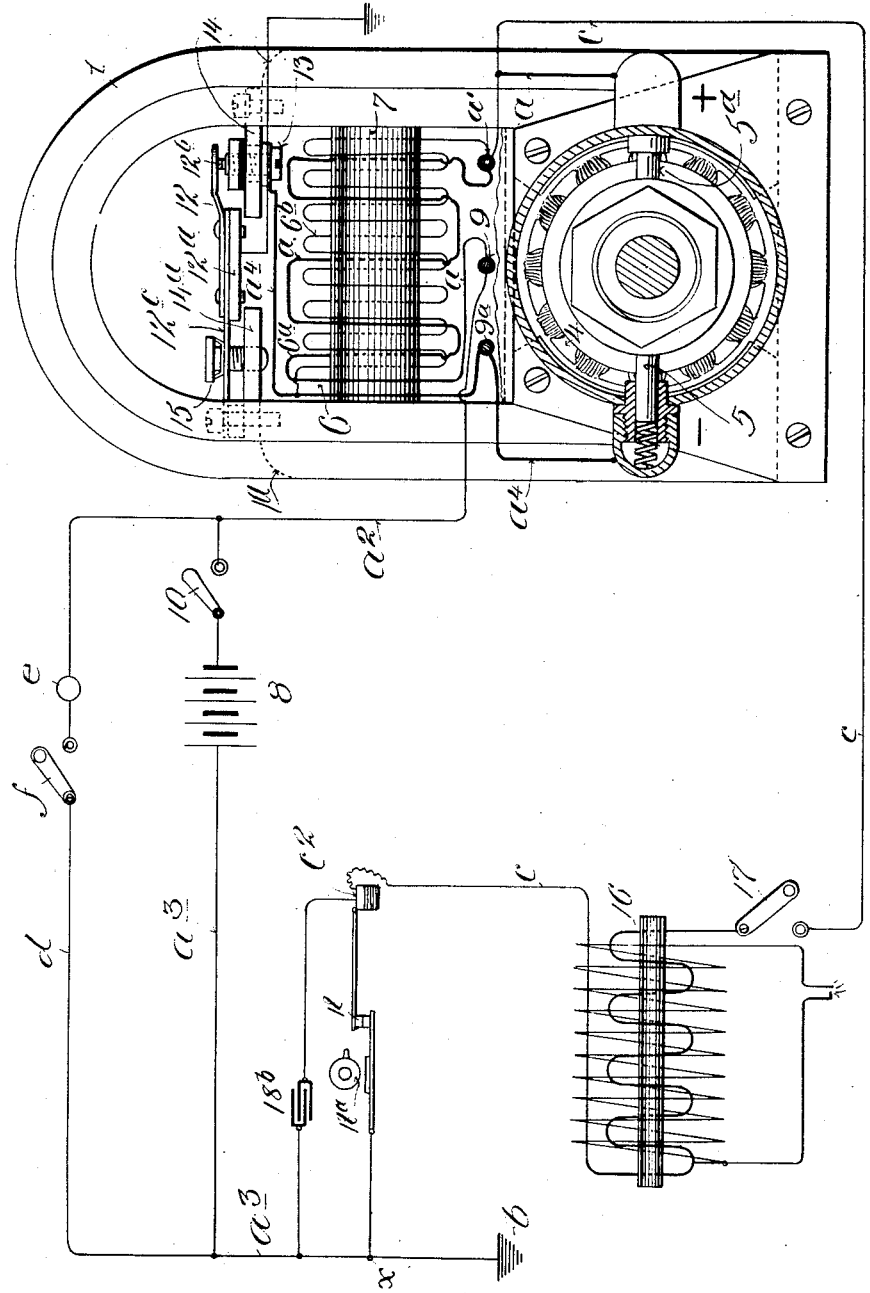

J. M. WILSON.
ELECTRIC CURRENT GENERATOR.
APPLICATION FILED FEB. 1, 1911.

1,038,254.

Patented Sept. 10, 1912.
3 SHEETS—SHEET 1.

Witnesses:

Inventor
James M. Wilson,
By his Attorney
T. F. Bourne

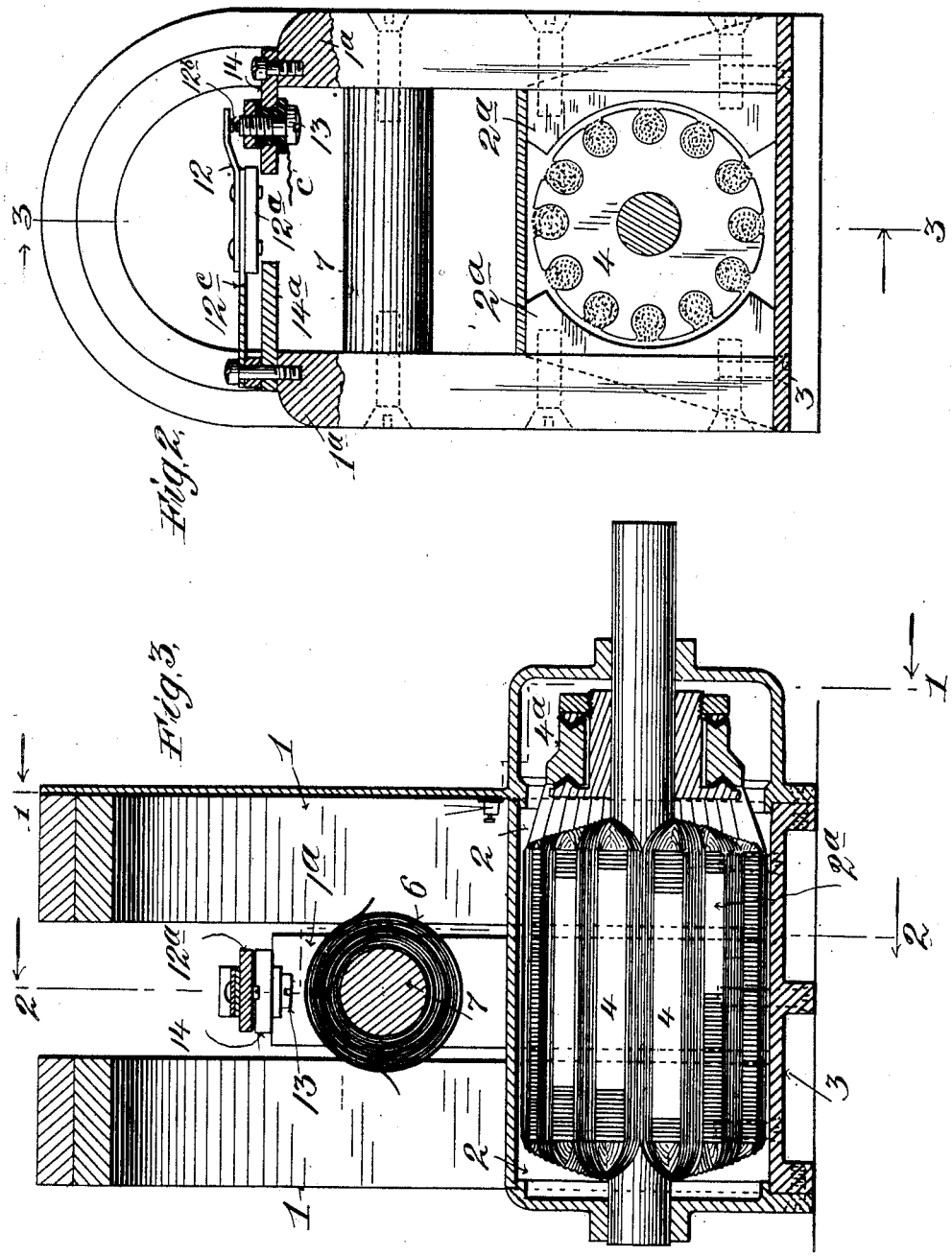

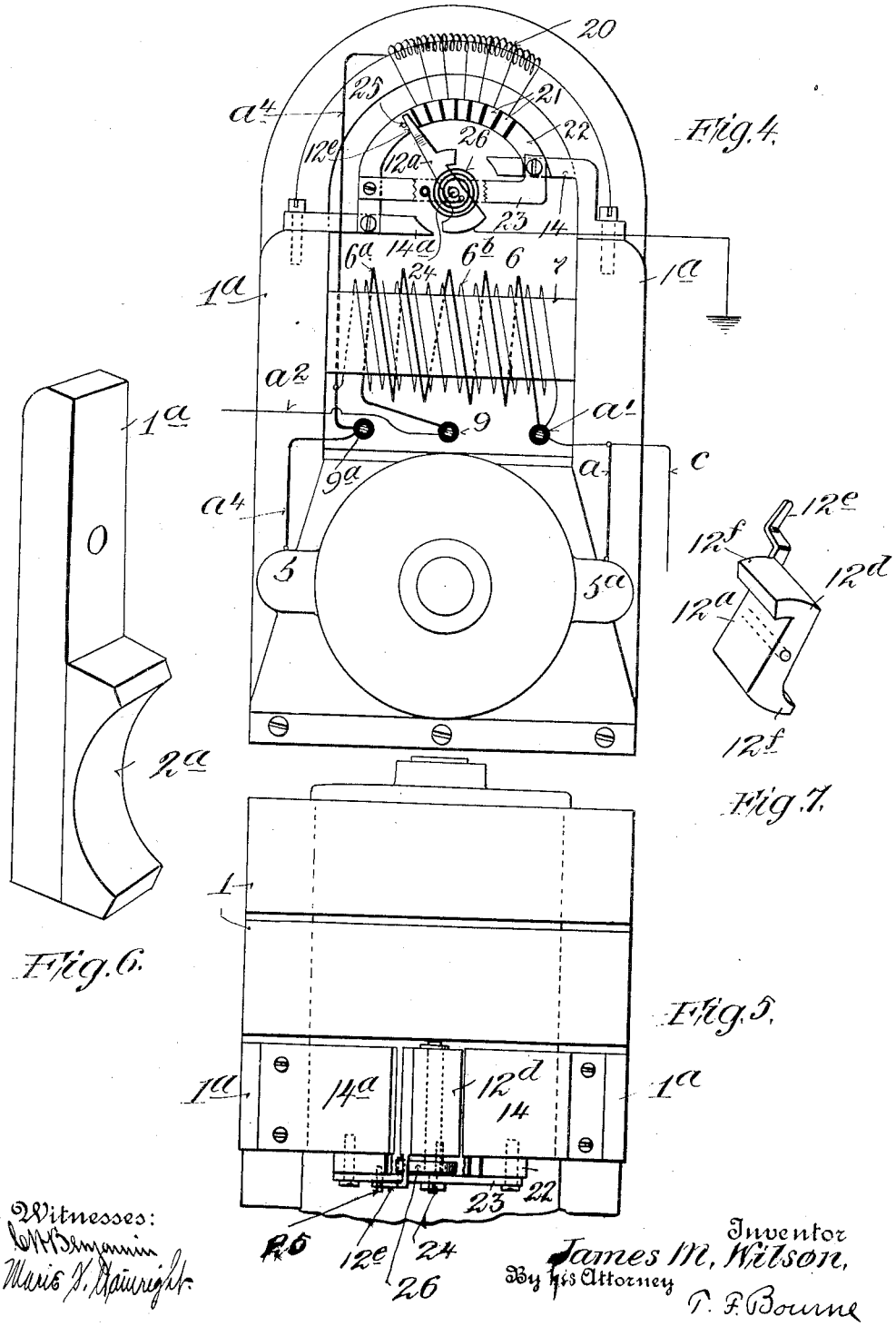

UNITED STATES PATENT OFFICE.

JAMES M. WILSON, OF NEW YORK, N. Y., ASSIGNOR, BY MESNE ASSIGNMENTS, TO SPLITDORF ELECTRICAL CO., OF NEWARK, NEW JERSEY, A CORPORATION OF NEW JERSEY.

ELECTRIC-CURRENT GENERATOR.

1,038,254.  Specification of Letters Patent.  Patented Sept. 10, 1912.

Application filed February 1, 1911. Serial No. 605,888.

*To all whom it may concern:*

Be it known that I, JAMES M. WILSON, a citizen of the United States, and resident of New York city, borough of Bronx, in the county of New York and State of New York, have invented certain new and useful Improvements in Electric-Current Generators, of which the following is a specification.

My invention relates to improvements in electric generators of the direct current class, and the invention has for its object to provide an improved form of direct current generator adapted to being driven at variable rates of speed, such as on automobiles and launches, in connection with internal combustion engines, and self-controlling its supply of current to the working circuit according to requirements.

In carrying out my invention I provide two sources of field energy in connection with one armature, comprising, primarily, permanent magnets and pole pieces, secondarily, a wound field and pole pieces, the two sources of field energy being magnetically divided on a non-magnetic base so as to primarily be independent of each other, but united in their magnetic action through such armature. I also provide means in connection with the wound field for the purpose of self controlling the electrical output of said armature according to requirements.

My invention also comprises novel details of improvement and combinations of parts that will be more fully hereinafter set forth and then pointed out in the claims.

Reference is to be had to the accompanying drawings forming part hereof, wherein, Figure 1 is a partly sectional elevation of a generator embodying my improvements, illustrated in connection with an ignition and lighting circuit for an automobile or boat, the section being taken on the line 1, 1, in Fig. 3; Fig. 2 is a section on the line 2, 2, in Fig. 3 looking in the direction of the arrows; Fig. 3 is a section on the line 3, 3, in Fig. 2; Fig. 4 is a front elevation of the generator illustrating the field coil and its pole pieces in a different position from that shown in Figs. 1, 2 and 3, and also illustrating resistance devices in the line circuit controlled by said field coil; Fig. 5 is a plan view of Fig. 4 parts being omitted; Fig. 6 is a detail view of a field coil pole piece, and Fig. 7 is a detail view of the movable member of the resistance device.

Similar numerals of reference indicate corresponding parts in the several views.

The numeral 1 indicates permanent magnets of any suitable form provided with suitable pole pieces 2, shown mounted upon the non-magnetic base 3, between which pole pieces the armature 4 rotates in usual manner. In Figs. 1, 2, 3 I have shown pole pieces $1^a$ having pole faces $2^a$ located between magnets 1 and their pole pieces 2, while in Figs. 4 and 5 I have shown the magnets 1 and their pole pieces 2 adjacent while the pole pieces $1^a$, $2^a$ are at one side of the magnets 1. The pole pieces $1^a$ are secured on the non-magnetic base 3 and are magnetically separated from permanent magnet pole pieces 2, and are utilized to form a magnetic field for the armature, as hereinafter explained. It will be understood that the generator is not limited to any particular number of magnets and pole pieces. The armature 4 may be of any suitable type of direct current armature, having commutator $4^a$, and brushes 5, $5^a$.

At 6 is a field coil having a plurality of windings upon a yoke 7 uniting the pole pieces $1^a$.

The working circuit $a$ starting from brush $5^a$, connects with post $a'$, passing thence through series winding $6^a$ to post 9, thence by conductor $a^2$ through switch 10 and battery 8, through conductor $a^3$ to ground as at $b$, (on the generator) and from ground through the closed contacts $12^b$ and 13 of regulator 12, thence by conductor $a^4$ to binding post $9^a$, and thence to brush 5 and through the armature to brush $5^a$, so that when the contacts $12^b$, 13 at regulator 12 are closed the battery will be charged by the generator. The regulator 12 is controlled by shunt winding $6^b$ of field coil 6 in conjunction with core 7 and pole pieces $1^a$, the circuit for winding $6^b$ being in direct shunt to the armature and shown as follows: from brush $5^a$ through conductor $a$ to post $a'$, thence through coil $6^b$ and conductor $a^4$ to post $9^a$, thence to brush 5 and through the armature to brush $5^a$. The arrangement is such that at a substantially predetermined relatively low speed of rotation of the armature there will not be sufficient current through the coil $6^b$ to cause attraction of contact $12^b$ by armature $12^a$ and pole extensions 14, $14^a$ of regulator 12 to close the working circuit at $12^b$, 13, and thus at such speed of the armature there will be no current from the armature in the working circuit. When the armature speeds up the magnetic leakage from the pole pieces $2^a$ will cause armature $12^a$ to be attracted by the pole projections 14, $14^a$ and close the working circuit at $12^b$, 13, and thereupon current from the armature will be supplied to the battery through the working circuit and its winding $6^a$ before mentioned. At such time the current in the series winding $6^a$ maintains the magnetic action in the pole pieces $1^a$ to a greater degree than maintained through the winding $6^b$, and keeps the circuit closed at regulator 12, even though less current than before flows through series winding $6^b$. During such speed of the armature above the aforesaid predetermined point, the current of the working circuit charges the battery, but when the speed of rotation of the armature falls below such point and the magnetic leakage in the pole pieces $1^a$ is not sufficient to maintain the circuit closed at the regulator against the action of its spring $12^c$, the working circuit will be broken at $12^b$, 13, and the battery will not be further charged until the armature again speeds up. The contact 13 of the regulator is shown insulated from its projecting pole piece 14, and the regulator is shown provided with a suitable screw 15, carried by projecting pole piece $14^a$, to regulate the tension of spring $12^c$ as required.

By having the permanent magnets 1 and the field coil 6 with its pole pieces $1^a$ in proper relation to the same armature, I am enabled to produce a generator of relatively small compass and adapted to relatively large electric output, the same being adapted to be placed in locations, such as in connection with automobile gas engines, where preparation has been made for relatively small sized magnetos, as distinguished from direct current generators with ring-type fields which make them unsuitable for a position in places that this generator can be adapted to, owing to the fact that the armature shaft in my improved generator may be set relatively lower than in the generators referred to.

In addition to illustrating the working circuit as including a battery I have shown the generator as adapted also to supply current for an ignition circuit for an internal combustion engine. This circuit may be traced as follows: from brush $5^a$ through conductor $c$ to switch 17, through the primary of induction coil 16 (for the plugs) and to the insulated binding post $c^2$, through circuit breaker 18, controlled by the cam $18^a$; and thence to ground $b$, whence the circuit leads to contact $12^b$ of regulator 12 and through its contact 13 and conductor $a^4$ including post $9^a$, to brush 5, and thence through the armature to brush $5^a$. A condenser $18^b$ is bridged across the circuit breaker 18. In describing the above named circuit it is assumed that the circuit is closed at the regulator 12, and that current is being supplied for the ignition circuit directly from the armature, but when the armature is running at such slow speed that the working circuit is broken at the regulator 12 the ignition circuit will be supplied directly from battery 8 as follows: from binding post $a'$, through conductor $c$, switch 17, the primary of coil 16, post $c^2$ and circuit breaker 18 to $x$, thence through conductor $a^3$ and the battery, through switch 10 and conductor $a^2$ to binding post 9, thence through series winding $6^a$ back to post $a'$ through conductor $a$. It will be seen that current from the armature divides, as at the binding post $a'$ for direct flow through the working circuit from the positive side of the generator to the positive side of the battery and through the primary of the coil, at which time the magnetic action in the field coil 6 serves to maintain the circuit closed at regulator 12, during the required speed of the armature, but when the speed of the armature falls below the required point and the working circuit of the armature is thereby broken at regulator 12, the current from the battery will flow in the opposite direction through the series winding and working circuit from the direction of flow previous therethrough from the armature as well as through the shunt winding, and have a tendency to release the regulator at contacts $12^b$, 13 because of a diminution of magnetism in the pole pieces $1^a$, caused by such reverse flow.

I have also shown a circuit $d$ across the battery including a translating device, such as a lamp $e$ and switch $f$, whereby the battery may supply current for lighting as well as for ignition. It will be understood, however, that the character or number of circuits supplied from my improved generator may be varied as desired.

In Figs. 4 and 5 I have illustrated armature $12^a$ rotatively operated for the purpose of introducing resistances or windings into the working circuit to maintain a substantially constant potential in the working circuit. For this purpose I have shown the conductor $a^4$ leading to one terminal of a suitable resistance coil or rheostat 20 connected with suitable contacts 21 shown carried by a non-magnetic support 22 and insulated therefrom and from each other, the support 22 being for convenience shown connected with non-magnetic bar 23 (shown partly broken away in Fig. 4), the parts 22 and 23 being shown supported by the pole piece extensions 14, 14ª. The movable member (armature) 12ª of the regulator is shown pivotally supported upon bar 23 by the rod or bolt 24 and its contact 12ᵉ normally maintained against stop 25 by a spring 26 shown connected at one end with bar 23 and at the other end with member 12ª, the latter being grounded in the circuit. The arrangement is such that when the armature 4 rotates at the relatively slow speed before stated, the working circuit will be broken by the contact 12ᵉ being out of engagement with a contact 21, but when said armature speeds up and supplies sufficient current for the winding 6ᵇ of field coil 6 to cause the poles 14, 14ª to attract the poles 12ᶠ of armature 12ª, the contact 12ᵉ of the latter will engage one or another of the contacts 21 thereby throwing in more or less resistance 20 on the working circuit in accordance with the current flowing through winding 6ᵇ of the field coil, such resistance serving to cut down the flow of current through the working circuit.

Since the pole pieces 1ª are independent of the magnets 1 and their pole pieces 2, the generation of current in armature 4 for the winding 6ᵇ will be additional to that derived from the permanent magnets. In other words, by means of my improvements I provide two sources of magnetism for the same armature, one being that derived by reason of the field coil and the other by reason of the permanent magnets, which are independent of each other magnetically and yet united in their action through one armature. By this arrangement of a wound field and a permanent magnet field, dividing them magnetically one from the other, I eliminate the possibility of one field using the other as a magnetic path or circuit instead of directing the lines of force through the armature as they should do and as is desired.

Having now described my invention what I claim is:

1. An electric generator comprising a permanent magnet having pole pieces, a non-magnetic base for said magnet and pole pieces, other pole pieces mounted upon said base, a winding correlated with the second named pole pieces and in series in the working circuit of the armature, a regulator for said circuit, and a winding for the second named pole pieces in shunt to said armature.

2. An electric generator provided with a permanent magnet and armature, a working circuit for the armature including a series winding, a winding in shunt to said armature, a yoke and pole pieces for said windings, and a regulator for the working circuit controlled by the current in the shunt winding.

3. An electric generator provided with a permanent magnet, an armature, a working circuit for the armature including a series winding, a winding in shunt to said armature, a yoke and pole pieces for said windings, a regulator for the working circuit controlled by the current in the shunt winding, and a battery included in the working circuit arranged to cause diminution of magnetism in the pole pieces of said windings when the regulator is released by the action of the shunt winding.

4. An electric generator comprising a permanent magnet, an armature, pole pieces, a yoke, a plurality of windings on said yoke, one of said windings being in series with the armature in the working circuit, the other winding being in shunt to the armature and out of the working circuit, and a regulator for the working circuit normally open until the armature attains a speed of rotation sufficient to cause the closing of the working circuit through the action of the shunt winding and its pole pieces.

5. An electric generator comprising a permanent magnet, a non-magnetic base supporting the same, an armature, pole pieces supported upon said base and provided with a yoke, a plurality of windings upon said yoke, one of said windings being in series with the working circuit through the armature, the other winding being in shunt to the armature and out of the working circuit, a regulator having contacts included in the working circuit, said contacts being open at a speed of rotation of the armature below a substantially predetermined point, said pole pieces having poles coacting with the armature of the regulator for attracting said armature when the first named armature speeds up above said predetermined point and supplies the required current in said shunt winding.

6. An electric generator comprising a permanent magnet having pole pieces, an armature, a yoke provided with pole pieces adjacent the armature, a plurality of windings upon said yoke, one of said windings being included in series in the working circuit from the armature, the other winding being in shunt to the armature, a regulator for the working circuit having contacts and an armature, said circuit being normally broken at said contacts, said second named pole pieces having means to attract said armature to close said circuit, whereby the working circuit will be broken at said contacts when the first named armature rotates at a speed below a substantially predetermined point and magnetic leakage from the pole pieces of the shunt winding will cause the regulator armature to close the working circuit when the armature speeds up above said predetermined point.

7. An electric generator provided with a permanent magnet, an armature, a working circuit for the armature including a series winding, a winding in shunt to said armature, a yoke and pole pieces for said windings, and a regulator for the working circuit controlled by the current in the shunt winding, and a resistance for the working circuit having a plurality of contacts insulated from each other to be engaged by the movable contact of the regulator to throw more or less resistance on the working circuit as the armature changes speeds.

Signed at New York city, in the county of New York, and State of New York, this 30th day of January, A. D. 1911.

JAMES M. WILSON.

Witnesses:
T. F. BOURNE,
HERMAN HERST, Jr.